(12) United States Patent
Pishe et al.

(10) Patent No.: US 11,645,267 B2
(45) Date of Patent: May 9, 2023

(54) TECHNIQUES FOR IN-MEMORY DATA SEARCHING

(71) Applicant: VISA International Service Association, San Francisco, CA (US)

(72) Inventors: Naveen Pishe, San Ramon, CA (US); Abhilash Srimat Tirumala Pallerlamudi, Mountain View, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 16/315,137

(22) PCT Filed: Sep. 22, 2016

(86) PCT No.: PCT/US2016/053190
§ 371 (c)(1),
(2) Date: Jan. 3, 2019

(87) PCT Pub. No.: WO2018/056993
PCT Pub. Date: Mar. 29, 2018

(65) Prior Publication Data
US 2019/0310974 A1    Oct. 10, 2019

(51) Int. Cl.
*G06F 16/23* (2019.01)
*G06F 16/22* (2019.01)
(Continued)

(52) U.S. Cl.
CPC .......... *G06F 16/2379* (2019.01); *G06F 16/00* (2019.01); *G06F 16/2255* (2019.01); *G06F 16/27* (2019.01)

(58) Field of Classification Search
CPC ... G06F 16/2379; G06F 16/27; G06F 16/2255
See application file for complete search history.

(56) References Cited

U.S. PATENT DOCUMENTS 5,204,958 A * 4/1993 Cheng ................ G06F 16/9027
707/999.102
5,495,609 A * 2/1996 Scott .................. G06F 16/2315
707/797
(Continued)

FOREIGN PATENT DOCUMENTS

CN 101114296 A * 1/2008 ............. G06F 21/10
CN 101114296 A    1/2008
(Continued)

OTHER PUBLICATIONS

SG11201811423S, "Written Opinion", dated Jun. 11, 2020, 6 pages.
(Continued)

*Primary Examiner* — Sherief Badawi
*Assistant Examiner* — Earl Levi Elias
(74) *Attorney, Agent, or Firm* — Kilpatrick Townsend & Stockton LLP

(57) ABSTRACT

Embodiments of the invention is directed to a method for performing efficient data searches in a distributed computing system. The method may comprise, receiving a first key. The method may further comprise determining a hash map associated with the first key from among a plurality of hash maps. In some examples, the obtained hash map maps a partition of a set of keys to particular index values. The method may further comprise determining an index value associated with a second key using the determined hash map. The method may further comprise determining transaction processing data associated with the first key using the determined index value and providing the transaction processing data. Utilization of the plurality of hash maps may enable a data search to be performed using on-board memory of an electronic device of the distributed computing system.

8 Claims, 9 Drawing Sheets

(51) Int. Cl.
*G06F 16/27* (2019.01)
*G06F 16/00* (2019.01)

(56) References Cited

U.S. PATENT DOCUMENTS

| | | | | |
|---|---|---|---|---|
| 6,035,326 | A * | 3/2000 | Miles | H04L 61/00 709/227 |
| 6,247,014 | B1 * | 6/2001 | Ladwig | G06F 16/9014 707/999.102 |
| 6,434,662 | B1 * | 8/2002 | Greene | G06F 16/9014 711/216 |
| 7,058,639 | B1 | 6/2006 | Chatterjee et al. | |
| 7,287,033 | B2 * | 10/2007 | Shadmon | G06F 16/81 707/999.102 |
| 7,370,055 | B1 * | 5/2008 | Pande | G06F 16/9027 707/692 |
| 7,499,912 | B2 * | 3/2009 | Hershkovich | G06F 16/2246 |
| 7,827,218 | B1 * | 11/2010 | Mittal | G06F 16/2228 707/899 |
| 7,930,547 | B2 * | 4/2011 | Hao | H04L 45/00 713/176 |
| 8,271,564 | B2 * | 9/2012 | Dade | G06F 16/2308 707/698 |
| 8,397,051 | B2 * | 3/2013 | Beaman | G06F 16/2255 711/216 |
| 8,838,558 | B2 * | 9/2014 | Luk | G06F 16/9014 709/244 |
| 8,868,506 | B1 * | 10/2014 | Bhargava | G06F 16/1774 707/648 |
| 9,009,165 | B2 * | 4/2015 | Anand | H04L 45/7453 707/747 |
| 9,384,145 | B2 * | 7/2016 | Gura | G06F 12/1018 |
| 2006/0277180 | A1 | 12/2006 | Okamoto | |
| 2008/0027870 | A1 * | 1/2008 | Nam | G06F 21/10 705/59 |
| 2011/0276781 | A1 * | 11/2011 | Sengupta | G06F 12/0897 711/216 |
| 2012/0011123 | A1 * | 1/2012 | Nagel | G06F 16/221 707/738 |
| 2013/0262443 | A1 | 10/2013 | Leida et al. | |
| 2014/0143364 | A1 * | 5/2014 | Guerin | H04L 69/324 709/212 |
| 2014/0149365 | A1 | 5/2014 | Minborg | |
| 2014/0359043 | A1 | 12/2014 | Gao et al. | |
| 2015/0288744 | A1 * | 10/2015 | Dwan | H04L 67/10 709/217 |
| 2015/0312144 | A1 * | 10/2015 | Gobriel | H04L 45/44 709/242 |
| 2016/0092483 | A1 | 3/2016 | Raja et al. | |

FOREIGN PATENT DOCUMENTS

| | | | | |
|---|---|---|---|---|
| CN | 101692651 A | * | 4/2010 | G06F 17/30949 |
| CN | 102591947 A | * | 7/2012 | G06F 12/0862 |
| CN | 102591947 A | | 7/2012 | |
| CN | 101692651 B | | 12/2014 | |
| EP | 0381418 A2 | * | 1/1990 | G06F 16/9014 |
| EP | 0381418 A2 | | 8/1990 | |
| EP | 0234803 | | 4/1994 | |
| WO | 0219063 A2 | | 3/2002 | |
| WO | WO-0219063 A2 | * | 3/2002 | G06F 16/954 |
| WO | 0227426 A2 | | 4/2002 | |
| WO | WO-0227426 A2 | * | 4/2002 | G06Q 10/10 |
| WO | 2015180125 A1 | | 12/2015 | |
| WO | WO-2015180125 A1 | * | 12/2015 | H04L 12/413 |
| WO | 2018056993 | | 3/2018 | |

OTHER PUBLICATIONS

PCT/US2016/053190, "International Search Report and Written Opinion", dated Jun. 22, 2017, 11 pages.
EP16916960.4, "Extended European Search Report", dated Mar. 17, 2020, 12 pages.
Notice of Decision to Grant in related Application No. SG11201811423S, dated Jul. 19, 2022, 6 pages.
Application No. CN201680090880.3, Office Action, dated Nov. 25, 2022, with English Translation, 34 pages.
Application No. EP16916960.4, Office Action, dated Feb. 28, 2023, 4 pages.

* cited by examiner

| KEY (INDEX VALUE) | VALUE (TRANSACTION PROCESSING DATA) |
|---|---|
| 0 | Transaction Processing Data 0 |
| 1 | Transaction Processing Data 1 |
| 2 | Transaction Processing Data 2 |
| 3 | Transaction Processing Data 3 |
| 4 | Transaction Processing Data 4 |
| 5 | Transaction Processing Data 5 |
| 6 | Transaction Processing Data 6 |
| 7 | Transaction Processing Data 7 |
| 8 | Transaction Processing Data 8 |
| 9 | Transaction Processing Data 9 |
| 10 | Transaction Processing Data 10 |
| 11 | Transaction Processing Data 11 |
| ... | ... |

*FIG. 7*

TECHNIQUES FOR IN-MEMORY DATA SEARCHING

CROSS REFERENCE TO RELATED APPLICATIONS

This application is the US national stage of PCT/2016/053190, filed Sep. 22, 2016, the disclosure of which is incorporated herein by reference in its entirety.

BACKGROUND

Distributed computing systems are often used for managing and processing large data sets. A distributed computing system may distribute a data base on several computers, the computers communicating with one other through various communication media, such as high-speed networks. Distributed database systems may consist of a single logical database which may be split into different fragments, each fragment being stored on a single computer (e.g., a node) of the distributed computing system. Distributed computing systems may present challenges regarding how the large data set is managed and/or accessed. For example, the exchange of information and additional computations required to coordinate tasks between computers are a form of overhead that does not arise in centralized systems. Additionally, a distributed computing system may be prone for errors since it is more difficult to ensure correctness of algorithms when the data set is spread over many computers of the distributed computing system. Additionally, searching the distributed computing system for a specific portion of the data set may be computationally expensive and may result in variable search times. Accordingly, improvements may be made to the data set and the distributed computing system to provide more efficient search times.

Current techniques for performing key searches may include constructing a search tree for the keys. However, the memory overhead of maintaining a search tree for a large set of keys can be impractical and even prohibitive. It may also be the case that search trees (and other containers such as hash maps) are subject to particular memory constraints, making the storage of a large data set ineffective. For example, as an entry is inserted into the search tree, the tree may have to be sorted or regenerated to preserve the searching functionality. Reconstructing or reordering a search tree of a large data set as entries are added, deleted, and/or modified may result in extensive utilization of resources and may provide inaccurate search results or delayed processing. Some techniques may utilize a hash table or another container for performing key searches. However, these containers have similar overhead issues. Additionally, utilizing current techniques may present drawbacks resulting from search collisions as many devices may be accessing the container at the same time. To avoid collisions, requests may be serially performed which results in longer computing times. Additionally, the search tree, hash map, or other container may be too large (e.g., 5 TB) to load into memory (e.g., 128 GB of random access memory (RAM)) of a node in a distributed computing system so they are often stored in a centralized location. Thus, searching for a key in these scenarios may be computationally extensive and may result in variable search times as the size of the data being searched is large and many systems may be attempting to access the data at the same time. Accordingly, improvements may be made to the data set and the distributed computing system to provide more efficient search times.

Embodiments of the invention address these and other problems, individually and collectively.

BRIEF SUMMARY

One embodiment of the invention is directed to a method comprising receiving a first key. The method may further comprise determining a hash map associated with the first key from among a plurality of hash maps, individual hash maps mapping a partition of a set of keys to particular index values, wherein the hash map associated with the first key is configured to be loaded into on-board memory of an electronic device. The method may further comprise determining an index value associated with a second key using the determined hash map. The method may further comprise determining transaction processing data associated with the first key using the determined index value, wherein utilizing the plurality of hash maps enables a lookup to be performed using on-board memory of an electronic device. The method may further comprise providing the determined transaction processing data.

Another embodiment of the invention is directed to a system that comprises one or more manager nodes and a plurality of worker nodes. The one or more manager nodes individually comprising a first processor, and a first computer readable medium coupled to the first processor, the first computer readable medium comprising code, executable by the first processor, for implementing a first method. The first method may comprise receiving a request message, the request message comprising a first key. The first method may further comprise transmitting at least a portion of the request message to one or more worker nodes of the plurality of worker nodes. The first method may further comprise receiving a response message associated with the request message. The first method may further comprise transmitting the response message. A worker node of the plurality of worker nodes may individually comprise a second processor, and a second computer readable medium coupled to the second processor, the second computer readable medium comprising code, executable by the second processor, for implementing a second method. The second method may comprise obtaining a first hash map comprising the first key, wherein the first hash map is configured to be stored in on-board memory of a plurality of worker nodes. The second method may further comprise determining a second hash map utilizing the first key and the first hash map, wherein utilizing the second hash map enables the index value to be determined using on-board memory of the worker node. The second method may further comprise obtaining the second hash map associated with the first key, the second hash map mapping a set of keys to particular index values. The second method may further comprise determining an index value associated with the first key using the second hash map. The second method may further comprise obtaining transaction processing data associated with the first key using the determined index value, wherein utilizing the second hash map enables the index value to be determined using on-board memory of the worker node. The second method may further comprise providing the determined transaction processing data.

Another embodiment of the invention is directed to a system that comprises one or more manager nodes, a plurality of worker nodes, and a centralized data store. The one or more manager nodes individually comprising a first processor, and a first computer readable medium coupled to the first processor, the first computer readable medium comprising code, executable by the first processor, for implementing a first method. The first method may comprise receiving a request message, the request message comprising a first key. The first method may further comprise obtaining a first hash map comprising the first key, wherein the first hash map is configured to be stored in on-board memory of the manager node. The first method may further comprise determining a second hash map utilizing the first key and the first hash map. The first method may further comprise sending information to a worker node of a plurality of worker nodes, the information comprising the first key, the worker node corresponding to the determined second hash map. The first method may further comprise receiving a response message associated with the request message. The first method may further comprise transmitting the response message. A worker node of the plurality of worker nodes may individually comprise a second processor, and a second computer readable medium coupled to the second processor, the second computer readable medium comprising code, executable by the second processor, for implementing a second method. The second method may comprise obtaining the second hash map associated with the first key, the second hash map mapping a set of keys to particular index values. The second method may further comprise determining an index value associated with the first key using the second hash map. The second method may further comprise obtaining transaction processing data associated with the first key using the determined index value, wherein utilizing the second hash map enables the index value to be determined using on-board memory of the worker node. The second method may further comprise providing the determined transaction processing data. The centralized data store may be accessible to the one or more manager nodes and the plurality of worker nodes. The centralized data store may store an index list, the indexed list comprising the transaction processing data.

Another embodiment of the invention is directed to an electronic device that comprises a processor, and a computer readable medium coupled to the processor, the computer readable medium comprising code, executable by the processor, for implementing a method. The method may comprise receiving an identifier associated with a dataset. The method may further comprise generating an indexed list corresponding to a subset of data of the dataset. The method may further comprise storing the indexed list. For each entry of the indexed list, the method may further comprise determining a first key associated with an entry of the indexed list. The method may further comprise updating a first hash map with the first key and an index value associated with the entry of the indexed list. The method may further comprise updating a second hash map with the first key and an identifier of the first hash map.

Another embodiment of the invention is directed to an electronic device that comprises a processor, and a computer readable medium coupled to the processor, the computer readable medium comprising code, executable by the processor, for implementing a method. The method may comprise receiving an identifier associated with a dataset. The method may further comprise generating an indexed list corresponding to a subset of data of the dataset. The method may further comprise storing the indexed list. For each entry of the indexed list, the method may further comprise determining a first key associated with an entry of the indexed list. The method may further comprise sending a hash map update request message comprising the first key, wherein receipt of the request message causes a first hash map to be updated with the first key and an index value associated with the entry of the indexed list. The method may further comprise updating a second hash map with a second key and an identifier of the first hash map.

These and other embodiments of the invention are described in further detail below.

BRIEF DESCRIPTION OF THE DRAWINGS

FIG. 7 shows a third example data structure that may be utilized by the distributed computing system in accordance with at least one embodiment.

DETAILED DESCRIPTION

Figure 1:
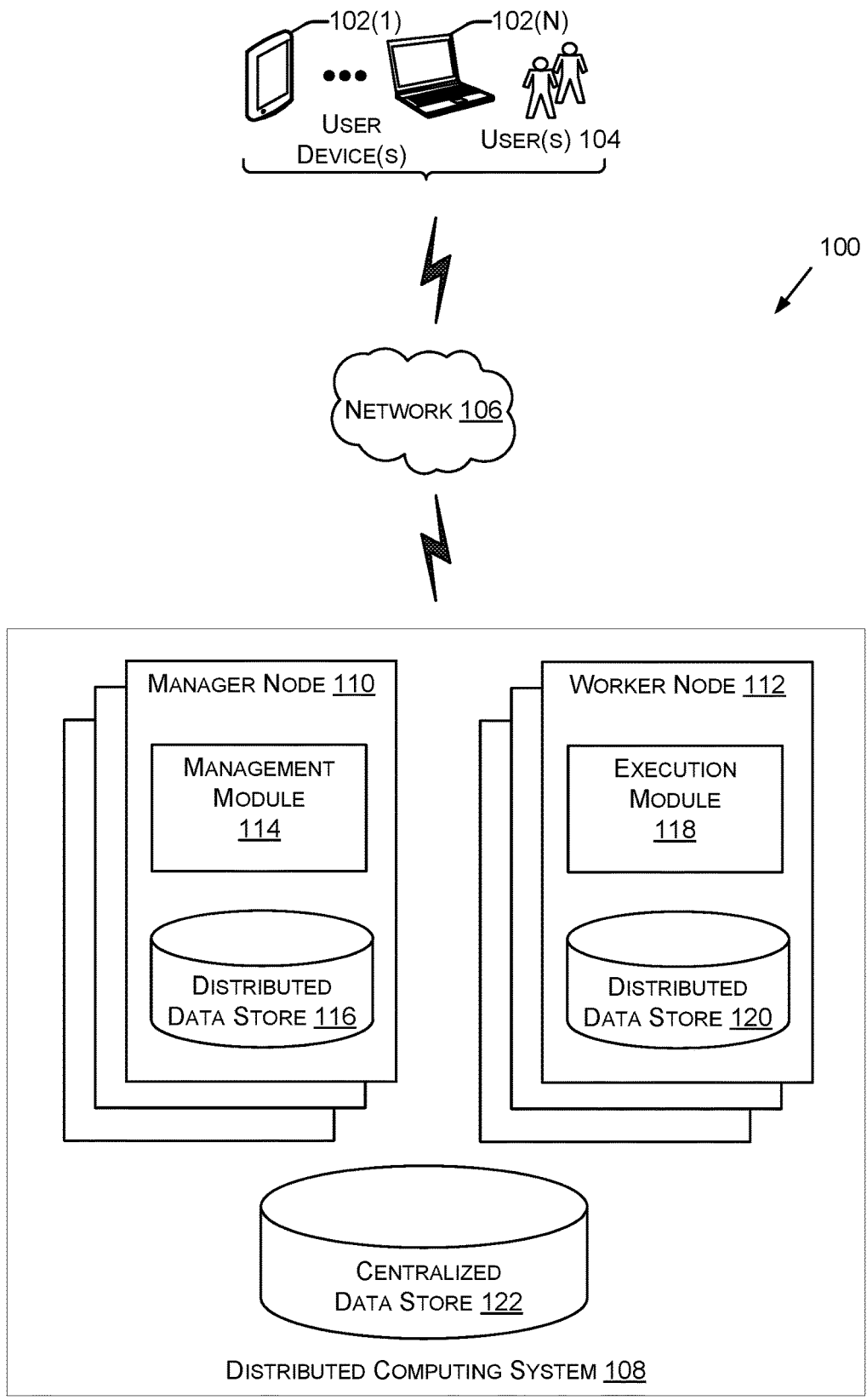
FIG. 1 depicts an example distributed computing environment in accordance with at least some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Prior to discussing the details of some embodiments of the present invention, description of some terms may be helpful in understanding the various embodiments.

A "distributed computing system" may refer to a collection of electronic devices communicatively coupled with one another. In some embodiments, subsets of a larger data set may be distributed amongst the distributed computing system (e.g., on memory within nodes of the system). The collection of electronic devices may be utilized to perform various functions (e.g., tasks). In some examples, the collection of electronic devices may include one or more manager nodes, one or more worker nodes, and/or one or more databases.

A "manager node" may be an electronic device that may be used to manage other nodes (e.g., worker nodes) in a distributed computing system. A manager node, in some examples, may be responsible for dispatching work (e.g., tasks) to one or more other nodes (e.g., worker nodes) in the distributed computing system. In some examples, a manager node may maintain a map (e.g., a hash map) that maps a key (e.g., an account identifier, a social security number, or another suitable alphanumeric identifier) to a value (e.g., another hash map or a location of another hash map). For example, a manager node may maintain a hash map that utilizes an alphanumeric identifier as input and outputs an identifier for another hash map (or in some cases, the other hash map itself). The manager node may be responsible for determining where the identified hash map corresponding to the key (e.g., the account identifier) is located (e.g., a particular node in the distributed computing system). The manager node may transmit information (e.g., request messages) to various nodes in the distributed computing system, and may receive information (e.g., response messages) from the various nodes on completion of the corresponding task(s) or at another suitable time.

A "worker node" may be an electronic device that may be used to process data (e.g., tasks) in a distributed computing system. In some examples, a worker node may receive information (e.g., a request message) from a manager node. The worker node may be responsible for performing various operations in order to perform a function (e.g., look up data). Upon processing the request, or at another suitable time, the worker node may transmit information (e.g., a response message) to another node in the distributed computing system (e.g., a manager node). In at least some example, the worker node may include some amount (e.g., 128 gigabytes (GB), 1 terabyte (TB), etc.) of on board memory (e.g., RAM) from which it may utilize during processing.

"Transaction processing data" may include data associated with a transaction. It may refer to any suitable data associated with a key. In some embodiments, transaction processing data may be payment account data associated with a user. In some embodiments, transaction processing data may include a shipping address, billing address, or other pertinent information associated with a consumer. In some examples, transaction processing data may include one or more account identifiers. In some embodiments, the account identifier may be a payment card number (PAN) and/or primary account number. A PAN may be 14, 16, or 18 digits. Transaction processing data may also include an expiration date associated with an account, as well as a service code and/or verification values (e.g., CVV, CVV2, dCW, and dCVV2 values). Transaction processing data may additionally, or alternatively, include past purchase information, navigational information related to website usage, fraudulent transaction rules associated with an account, or any suitable data that may be associated with a key with which a search may be conducted. Such data may, or may not, pertain to a consumer account/transaction.

A "protocol set" may be a set of rules or configuration settings that indicates one or more actions are allowed and/or should be performed. In some cases, the protocol set may include conditions upon which those actions are to be performed. In some embodiments, a protocol set may include conditional statements, such as "if x_condition occurs, then perform y_action." In some embodiments, a protocol set may include policies for specifying when and/or what particular actions should be performed in relation to detecting fraudulent transactions. In some examples, the protocol set may be stored with other protocol sets in a storage container for protocol sets.

A "request message" is an electronic message that may include any suitable information necessary for requesting data (e.g., transaction processing data, fraudulent transaction protocol set(s), etc.). In some embodiments, the request message may be directed to a manager node of a distributed computing system and/or between nodes (e.g., between manager and worker, between worker and worker, etc.) of the distributed computing system. In some embodiments, a request message may include one or more keys (e.g., account identifier, card number, social security number, an alphanumeric identifier, etc.) to be utilized to search for the requested data.

A "response message" may include any suitable information necessary for providing data related to the request message. For example, the response message may include the data requested (e.g., transaction processing data, a fraudulent transaction protocol set, etc.).

A "hash map" may include a data structure that can be used to implement an associative array, a data structure that can map keys to values. A "key" may include any suitable data (e.g., an account identifier, an alphanumeric identifier, a data object, a social security number, a name, etc.) for which a value may be associated. A hash map may utilize a hash function to compute an index into an array of keys, from which a desired value can be found (e.g., a value associated with a particular key). In at least one example, a hash map may provide O(1) algorithmic complexity when used to perform searches.

"Algorithmic Complexity" refers to how fast or slow a particular algorithm performs. For example, an average case runtime complexity of an algorithm as a function defined by an average number of sets taken on any instance of size x. An algorithm is said to run in constant time if it requires the same amount of time regardless of the input size. For example, accessing an element in an array runs in constant time (otherwise notated by "O(1)") because accessing an element of the array doesn't depend on how many elements are stored in the array. Algorithmic complexity is further discussed below with respect to FIG. 4.

"Big O notation," denoted by O(x) denotes the performance or complexity of an algorithm. Big O notation specifically describes the worst-case scenario and can be used to describe the execution time required or the space used (e.g., in memory or on disk) by an algorithm. Said another way, Big O notation describes the limiting behavior of a function when the argument tends towards a particular value or infinity. Big O notation is often used to classify algorithms by how they respond to changes in input size, such as how the processing time of an algorithm changes as the problem size becomes extremely large.

A "hash map update request message" may include information pertaining to an creation and/or modification of a hash map. For example, a hash map update request message may include a key (e.g., an account identifier) and a value (e.g., an index) which may be stored in a hash map on a worker node in a distributed computing environment.

A "hash map update response message" may include an indication as to the successfulness of a hash map update request. For example, a hash map update response message may indicate whether the update was successful or unsuccessful. In some examples, if the update is unsuccessful, the hash map update response message may include an indication as to why the update was unsuccessful (e.g., memory full, key already exists, etc.).

A "indexed list" may be a data structure that map keys (e.g., index values) to values. In at least one example, an indexed list may be an array that maps index values to transaction processing data. In at least one example, an indexed list may provide O(1) algorithmic complexity when used to perform searches.

A "user device" may be an electronic device that is operated by a user. Examples of user devices may include a mobile phone, a smart phone, a personal digital assistant (PDA), a laptop computer, a desktop computer, a server computer, a vehicle such as an automobile, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. The user device may comprise any electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "processor" may refer to any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

Details of some embodiments of the present invention will now be described.

As distributed computing systems are widely used to manage large data sets, the ability to perform efficient searches is of tantamount concern. In current systems, a master database may be accessible by each node of the distributed computing system. Such an approach presents challenges. For example, maintaining a master database on disk may result in variable search times as the data set is large and difficult to search. Additionally, the data set may be too large to store in a container (e.g., a hash map, an indexed list) due to memory constraints of the container. What is required is a more efficient searching solution. Although useful in particular for financial transaction processing, this invention is broadly applicable to applications that use large data sets that may be associated with a key. For example, although examples described herein utilize account numbers as keys, other values, such as social security numbers, names, addresses, alphanumeric identifiers, or any suitable key values may be used.

Embodiments of the inventions are directed to methods and systems that may be utilized to manage a number of data structures on a set of nodes of a distributed computing system. Utilization of the data structures described herein enables the distributed computing system to distribute the data set among the set of nodes in order to provide constant O(1) algorithmic efficiency when performing data searches. In some embodiments, the system may receive data set identification information that specifies a data set and/or location of a data set to be distributed. The system may break apart the data set into smaller portions to be stored in customized data structures on the set of nodes. In some examples, the system may determine available storage space on each of a set of nodes (e.g., some portion of nodes of a distributed computing system) and generate the data structures described herein according to the available storage space on each node. In at least one embodiment, the system may cause a data structure to be created that provides an indexed list (e.g., an array) that maps an index value to transaction processing data (e.g., the requested data). Additionally, the system may cause a set of hash maps to be maintained on a set of nodes (e.g., worker nodes), an individual hash map of the set of hash maps providing a map of keys (e.g., an account identifier) to index values (e.g., index values of the indexed list). The system may cause a processor on each of the set of nodes to maintain one or more hash maps of keys (e.g., account identifiers) to index values (e.g., 0, 1, 2, 3, . . . etc.) that correspond to particular transaction processing data associated with each key. The system may further cause a processor on a same or different set of nodes (e.g., one or more manager nodes) to maintain a hash map that maps keys (e.g., account identifiers, alphanumeric values, etc.) to another hash map (e.g., a hash map of the set of hash maps that map keys to index values).

In at least one embodiment, the system (e.g., a distributed computing system) may receive a request message for transaction processing data associated with a key (e.g., an account identifier, an alphanumeric value, etc.). The request message may be received by a manager node of the distributed system. The manager node may forward the request message to a worker node of the distributed system. The worker node may utilize a hash function to hash the key to determine a hashed key. The hashed key may be utilized with a first hash map to return the location of a second hash map or a hash map identifier that corresponds to the key. The worker node may utilize the key (e.g., the account identifier) and a same or different hash function to generate a hashed key. The hashed key may be utilized by the worker node to perform a lookup of the second hash map to return an index value. The worker node may then utilize the index value returned in order to perform a look up from an indexed list. The lookup from the indexed list may return transaction processing data associated with the index value. The returned transaction processing data may be provided to the manager node, and eventually, a user device having initiated the request message.

In at least one embodiment, the system (e.g., a distributed computing system) may receive a request message for transaction processing data associated with a key (e.g., an account identifier, an alphanumeric value, etc.). The request message may be received by a manager node of the distributed system. The manager node may utilize a hash function to hash the key to determine a hashed key. The hashed key may be utilized to return the location of a second hash map or a hash map identifier that corresponds to the key. The manager node may utilize the returned location or identifier to provide the request message to a particular worker node of the distributed computing system. The worker node, upon receipt of the request message, or at another suitable time, may utilize the key (e.g., the account identifier) and a same or different hash function to generate a hashed key. The hashed key may be utilized by the worker node to perform a lookup of the second hash map (stored in on-board memory of the worker node) to return an index value. The worker node may then utilize the index value returned in order to perform a look up from an indexed list (the indexed list being stored on-board or in a centralized location). The lookup from the indexed list may return transaction processing data associated with the index value. The returned transaction processing data may be provided to the manager node, and eventually, a user device having initiated the request message.

FIG. 1 depicts an example distributed computing environment 100 in accordance with at least some embodiments. The distributed computing environment 100 may comprise one or more user devices 102(1)-102(N) (hereinafter "the user devices 102) operated by users 104. The user devices 102 may also be in communication, via network 106, with distributed computing system 108. The user devices 102 may be operable by one or more of the users 104 to access the distributed computing system 108 via the network 106. The user devices 102 may be any suitable device capable of communicating with the network 106. For example, the user devices 102 may be any suitable computing device such as, but not limited to, a mobile phone, a smart phone, a personal digital assistant (PDA), a laptop computer, a thin-client device, a tablet PC, a desktop computer, a set-top box, or other computing device.

The distributed computing system 108 may have any suitable characteristics. The distributed computing system 108 may include one or more manager nodes (e.g., a manager node 110), one or more worker nodes (e.g., a worker node 112), and one or more centralized data stores (e.g., a centralized data store 122) for performing the functionality described herein. The manager node 110 and the worker node 112 may be communicatively coupled to one another. The manager node 110, in conjunction with a data process, may include a management module 114 that is configured to perform functionality including receiving/processing/transmitting request messages, receiving/processing/transmitting response messages, receiving/processing/transmitting hash map update request/response messages, maintaining one or more data structures, and causing one or more other data structures to be stored in the distributed data store 120 and/or the centralized data store 122. The manager node 110 may further include a distributed data store 116 that is configured to store the one or more data structures. For example, in some cases, the distributed data store 116 may be configured to store a hash map that maps a key (e.g., an account identifier, alphanumeric identifier, etc.) to a hash map (e.g., a hash map stored on distributed data store 120 of the worker node 112, discussed further below). In at least one example, the distributed data store 116 may be random access memory (RAM) of the manager node 110.

The worker node 112, in conjunction with a data process, may include an execution module 118. The execution module 118 may be configured to perform functionality including receiving and processing request messages, transmitting response messages, receiving hash map update request messages, transmitting hash map update response messages, and maintaining one or more data structures associated with a larger data set. The worker node 112 may further include a distributed data store 120. The distributed data store 120 may be configured to store the one or more data structures associated with a larger data set and/or any suitable information. For example, the distributed data store 120 may be configured to store one or more hash maps that map keys (e.g., account identifiers) to locations/identifiers of other hash maps, one or more hash maps that map keys (e.g., account identifiers) to index values, and one or more indexed lists (e.g., an indexed list that maps index values to transaction processing data). In at least one example, the distributed data store 120 may be random access memory (RAM) of the worker node 112.

The distributed computing system 108 may further include a centralized data store (e.g., the centralized data store 122). The centralized data store may be configured to store one or more data structures associated with a larger data set. For example, the centralized data store 122 may be configured to store an indexed list that maps a key (e.g., and index value) to a value (e.g., transaction processing data, fraud transaction protocol sets, or any suitable data). In at least one embodiment, the centralized data store 122 may be accessible by manager node 110 and/or the worker node 112.

Messages between the computers, networks, and devices in FIG. 1 may be transmitted using a secure communications protocols such as, but not limited to, File Transfer Protocol (FTP); HyperText Transfer Protocol (HTTP); Secure HyperText Transfer Protocol (HTTPS), Secure Socket Layer (SSL), ISO (e.g., ISO 8583) and/or the like.

Each of the entities in FIG. 1 may communicate through any suitable communication channel or communications network (e.g., the network 106). A suitable communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Figure 2:
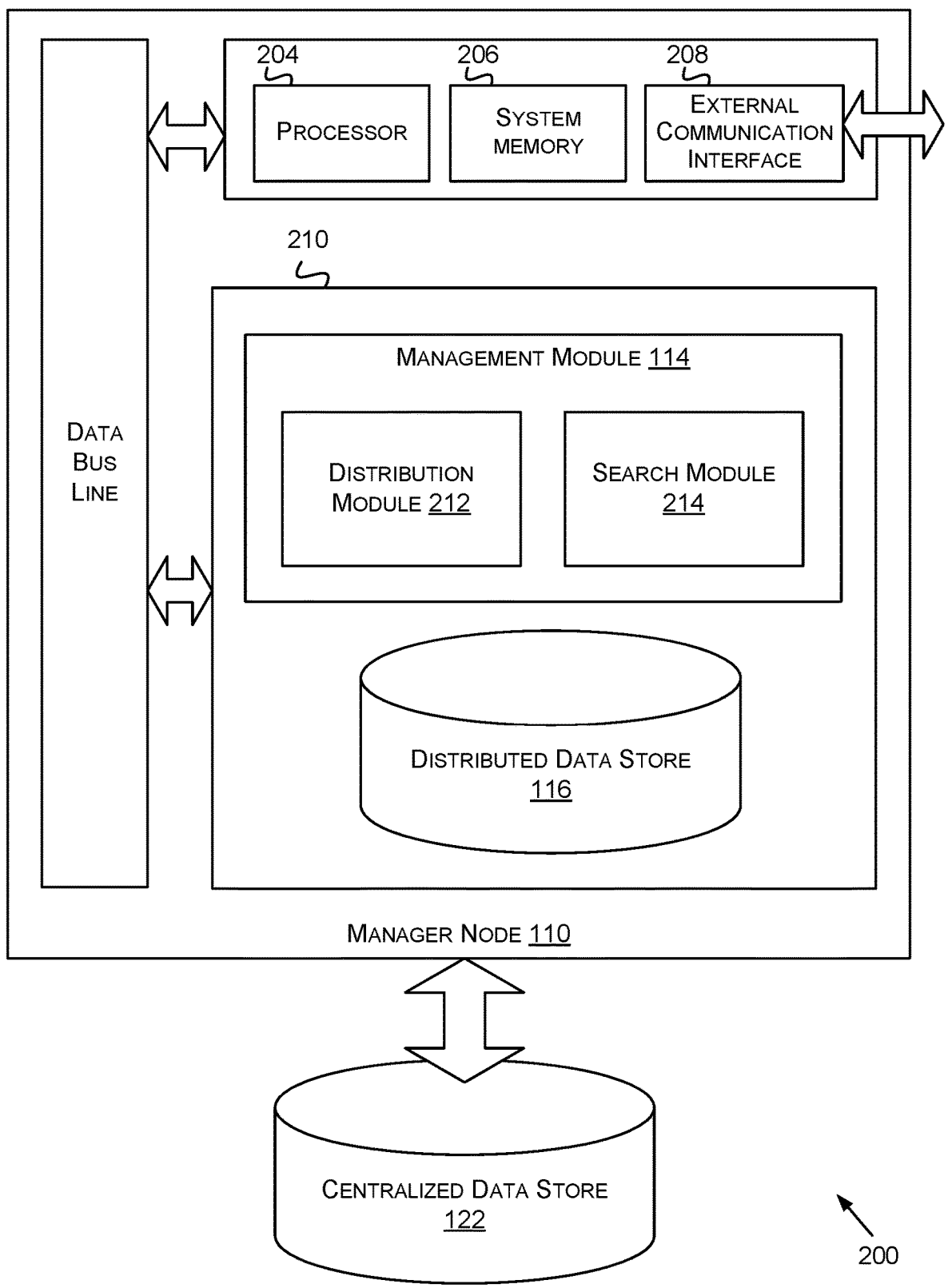
FIG. 2 depicts an example computer architecture capable of implementing at least some embodiments of a manager node of a distributed computing system.

FIG. 2 depicts an example computer architecture 200 capable of implementing at least some embodiments of a manager node (e.g., the manager node 110 of FIG. 1) of the distributed computing system 108 of FIG. 1. The manager node 110 may individually include a processor and a computer readable medium coupled to the processor, the computer readable medium comprising code, executable by the processor for performing the functionality described herein. It should be appreciated that any functionality described with respect to the modules of FIG. 2 may be combined to be performed by a single module or may be performed by a module that is external to the manager node 110. FIG. 2 shows the manager node 110 communicatively couple to the centralized data store 122. The centralized data store 122 may be configured as depicted in FIG. 2, or the centralized data store 122 may be provided, in whole or in part, as part of the manager node 110. The distributed data store 116, the centralized data store 122 (as well as any other database described herein) may be a conventional, fault tolerant, relational, scalable, secure database such as Oracle™ or Sybase™. The distributed data store 116 and/or the centralized data store 122 may be implemented using various data structures, such as an array, hash map, (linked) list, structured text file (e.g., XML), table, and/or the like. Such data structures may be stored in memory and/or in structured files.

The manager node 110 may comprise a processor 204, which may be coupled to a system memory 206 and an external communication interface 208. A computer readable medium 210 may also be operatively coupled to the processor 204.

The computer readable medium 210 may comprise a number of software modules including a distribution module 212 and a search processing module 214. More or fewer modules may be utilized to perform the functionality described herein.

The distribution module 212 may comprise code, that when executed, causes the processor 204 to determine a distribution of a data set. For example, the distribution module 212 may receive a request to distribute a data set. The request may include an identifier for the data set. In response to the request, the distribution module 212 may be configured to cause the processor 204 to access the identified data set (e.g., stored in the centralized data store 122) and to generate a data structure to store a portion of the data set. For example, the distribution module 212 may cause the processor 204 to execute code to generate an indexed list (e.g., data structure 700, discussed below). The indexed list may map an index value (e.g., 0, 1, 2, 3, etc.) to a value (e.g., a transaction processing data, a fraudulent transaction protocol set, etc.). For example, the distribution module 212 may cause the processor 204 to generate an indexed list of transaction processing data in an order in which it was created/received. The distribution module 212 may cause the indexed list to be stored in memory (e.g., on one or more worker nodes, on centralized data store 122, etc.). In at least one example, the distribution module 212 may cause multiple indexed lists to be created and stored in memory on one or more worker nodes, on the centralized data store 122 or in any suitable storage location. These multiple indexed lists may correspond to sub-portions of the transaction processing data of the data. In some examples, one of these multiple indexed lists may be collocated on a worker node with one or more hash maps that relate to the same transaction processing data as contained in the indexed list.

In at least one example, the distribution module 212 may be configured to cause the processor 204 to determine account identifiers that correspond to each index value. The distribution module 212 may be configured to cause one or more hash maps (e.g., data structure 600, discussed below) to be created that individually map a portion of the account identifiers to corresponding index values. The distribution module 212 may be configured to cause another hash map (to be created that maps account identifiers to another hash map that map keys (account identifiers) to corresponding index values. Accordingly, the distribution module 212 may be configured to cause the processor 204 to create a first hash map that maps keys to other hash maps, a plurality of other hash maps that individually map a subset of the keys to index values, and an indexed list that maps index values to transaction processing data that corresponds to the key. In at least one embodiment, the distribution module 212 may be configured to cause one or more hash maps and one or more indexed lists to be stored (e.g., on a manager node, on a worker node, or on a centralized data store).

In a non-limiting example, the distribution module 212 may be configured to cause the processor 204 to determine account identifiers that correspond to each index value. The distribution module 212 may be configured to cause the processor 204 to determine available memory on at least one node (e.g., the worker node 112 of FIG. 1) of the distributed computing system 108. The distribution module 212 may be configured to cause the processor 204 to transmit a hash map update request message to the worker node 112 in order to cause an entry in a hash map to be created/updated on the worker node 112. The hash map update request message may include a key (e.g., the account identifier) and a value (e.g., the index value). The created/updated hash map may be stored on the worker node 112 (e.g., in RAM of the worker node 112). In at least one example, the distribution module 212 may be configured to cause the processor 204 to receive a hash map update response message from the worker node 112. The hash map update response message may indicate whether or not the entry was successfully created/updated. In at least one example, further processing may depend on the contents of the hash map update response message (e.g., an indication of success/failure, a reason identifier, etc.). For example, if the hash map update response message indicates that the entry was not created/updated in the hash map of the worker node 112, then the distribution module 212 may be configured to cause the processor 204 to cease processing the distribution of the data set, or in some cases, of that entry. In accordance with at least one embodiment, the distribution module 212 may be configured to cause the processor 204 to provide a user device (e.g., the user devices 102 of FIG. 1) the indication and/or reason.

In some cases, the distribution module 212 may be configured to cause the processor 204 to transmit a hash map update request message to another worker node in the distributed computing system, while in other examples, the distribution module 212 may be configured to cause the processor 204 to cease processing the failed entry.

In at least one example, the distribution module 212 may be configured to cause the processor 204 to create and/or update an entry on another hash map. This hash map may map a key (e.g., an account identifier) to a value (e.g., an identifier of the first hash map on the worker node 112, the location of the first hash map, etc.). The distribution module 212 may be configured to cause the processor 204 to store the created/updated hash map in local storage (.e.g., the distributed data store 116). As depicted in FIG. 2, the distributed data store 116 may be included as part of the manager node 110 (e.g., RAM of the manager node 110). In at least one example, the distribution module 212 may be configured to cause the processor 204 to perform the aforementioned functions for each entry of the data set, or at least some portion of the data set, in order to distribute information about the data set/portion amongst one or more worker nodes. The hash map stored on the distributed data store 116 may serve as a tool for locating particular data once distribution has commenced/completed.

The search processing module 214 may comprise code that, when executed, causes the processor 204 to receive and process request messages (e.g., from the user devices 102 of FIG. 1). In at least one embodiment, the search processing module 214 may be configured to cause the processor 204 to transmit request messages to one or more worker nodes (e.g., the worker node 112) of the distributed computing system 108 of FIG. 1. The search processing module 214 may further be configured to cause the processor 204 to receive and process response messages from the worker nodes (e.g., the worker node 112), and/or to transmit response messages to the user devices 102. The search processing module 214 may further be configured to cause the processor 204 to perform lookups utilizing an internally-stored data structure (e.g., the stored hash map that maps keys such as account identifiers to other hash maps/location of other hash maps). The search processing module 214 may further be configured to utilize an index value to perform a lookup from the centralized data store 122. In at least one example, the centralized data store 122 may be configured to store a data structure (e.g., an indexed list) that associated a key (e.g., an index value) to a return value (e.g., transaction processing data.

Figure 3:
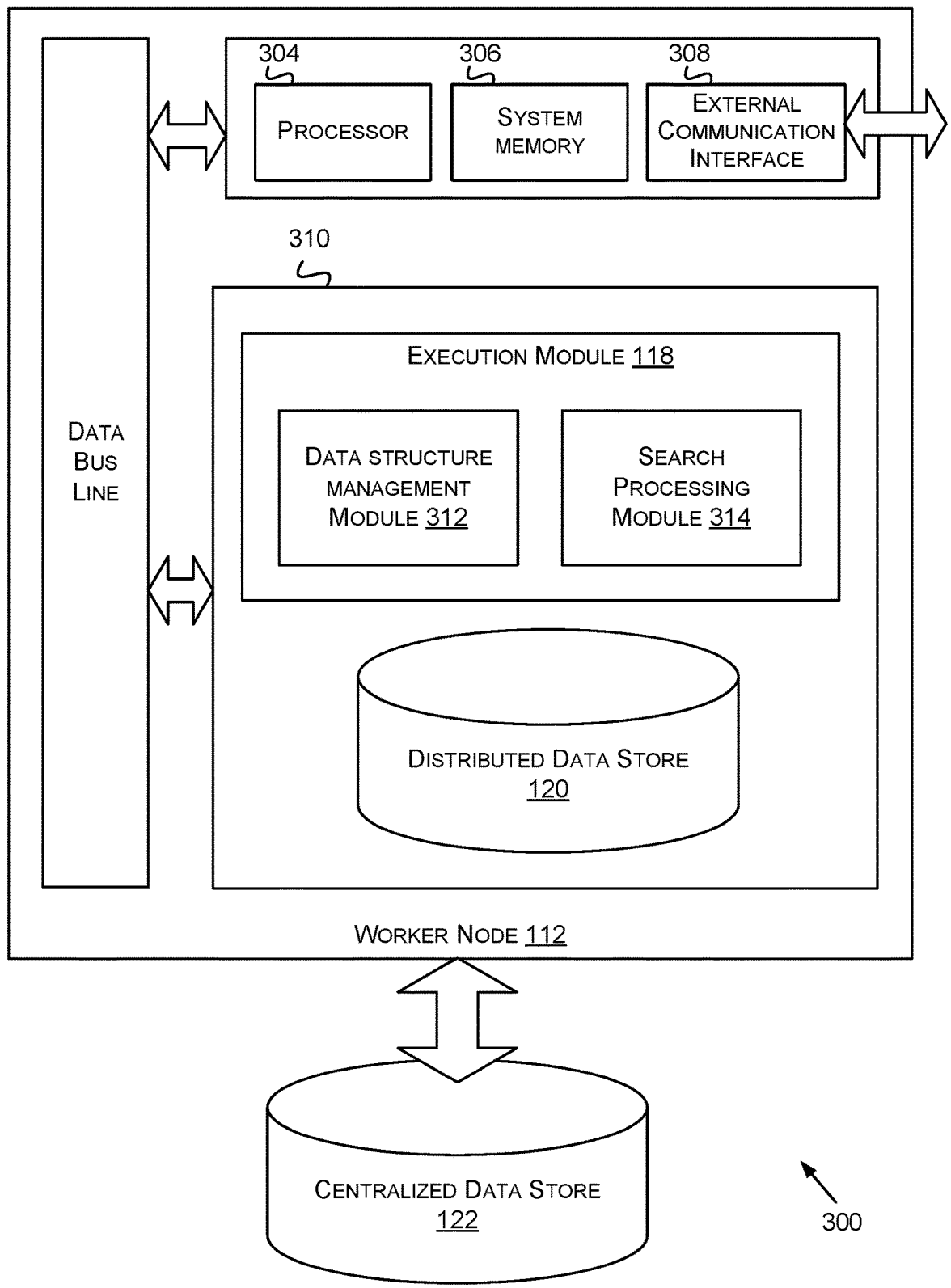
FIG. 3 shows an example computer architecture capable of implementing at least some embodiments of a worker node of a distributed computing system.

FIG. 3 depicts an example computer architecture 300 capable of implementing at least some embodiments of a worker node (e.g., the worker node 112 of FIG. 1) of the distributed computing system 108 of FIG. 1. The worker node 112 may individually include a processor 304 and a computer readable medium 310 coupled to the processor 304, the computer readable medium 310 comprising code, executable by the processor for performing the functionality described herein. It should be appreciated that any functionality described with respect to the modules of FIG. 3 may be combined to be performed by a single module or may be performed by a module that is external to the worker node 112. FIG. 3 shows the worker node 112 communicatively couple to the centralized data store 122. The centralized data store 122 may be configured as depicted in FIG. 3, or the centralized data store 122 may be provided, in whole or in part, as part of the worker node 112. The distributed data store 120 and/or the centralized data store 122 may be implemented using various data structures, such as an array, hash map, (linked) list, structured text file (e.g., XML), table, and/or the like. Such data structures may be stored in memory and/or in structured files.

The worker node 112 may comprise the processor 304, which may be coupled to the system memory 306 and an external communication interface 308. A computer readable medium 310 may also be operatively coupled to the processor 304.

The computer readable medium 310 may comprise a number of software modules including a data structure management module 312 and a search processing module 314. More or fewer modules may be utilized to perform the functionality described herein.

In at least one example, the data structure management module 312 may comprise code that, when executed, causes the processor 304 to receive a hash map and/or an indexed list. The data structure management module 312 may be configured to cause the processor 304 to store the received hash map(s)/indexed list(s) on the distributed data store 120.

In some embodiment, the data structure management module 312 may comprise code that, when executed, causes the processor 304 to receive a hash map update request message (e.g., from the manager node 110 of FIGS. 1 and 2). The hash map update request message may include a key (e.g., an account identifier) and a value (e.g., an index value) to be maintained by the worker node 112 within a hash map to be stored, or already stored, on the distributed data store 120. Upon receipt of the hash map update request message, the data structure management module 312 may cause the processor 304 to create and/or update a hash map stored in the distributed data store 120. In at least one example, the data structure management module 312 may be further configured to cause the processor 304 to send a hash map update response message to the manager node 110, indicating whether creation/update of the hash map was successful or unsuccessful. The hash map update response message may include a reason code associated with a reason creation/update was unsuccessful (e.g., memory full, key already exists, etc.).

The search processing module 314 may comprise code that, when executed, causes the processor 304 to receive and process request messages (e.g., from the manager node 110 of FIGS. 1 and 2). In at least one embodiment, the search processing module 314 may be configured to cause the processor 304 to extract a key (e.g., an account identifier) from a request message. The search processing module 314, in some examples, may cause the processor 304 to utilize a hash function to hash the extracted key to produce a hashed key. The search processing module 314 may cause the processor 304 to access the distributed data store 120 in order to access a stored hash map (e.g., a hash map that maps keys to other hash maps, a hash map that maps keys to index values).

In at least one embodiment, the search processing module 314 may cause the processor 304 to utilize a hashed key as input into a hash map (a hash map that maps keys to other hash maps such as data structure 500 of FIG. 5, discussed below) in order to obtain another stored hash map that maps keys to index values.

In at least one embodiment, the search processing module 314 may cause the processor 304 to utilize a hashed key as input into a stored hash map in order to obtain an index value associated with the key. The search processing module 314 may cause the processor 304 to access the centralized data store 122 in order to access a stored indexed list (e.g., an array/indexed list that maps index value to transaction processing data. The search processing module 314 may cause the processor 304 to utilize the index value as input into the indexed list in order to obtain transaction processing data that is associated with the index value (and thus, the original key). In at least one example, the search processing module 314 may be further configured to cause the processor 304 to transmit the obtained transaction processing data to the manager node 110 of FIGS. 1 and 2 in a response message.

Figure 4:
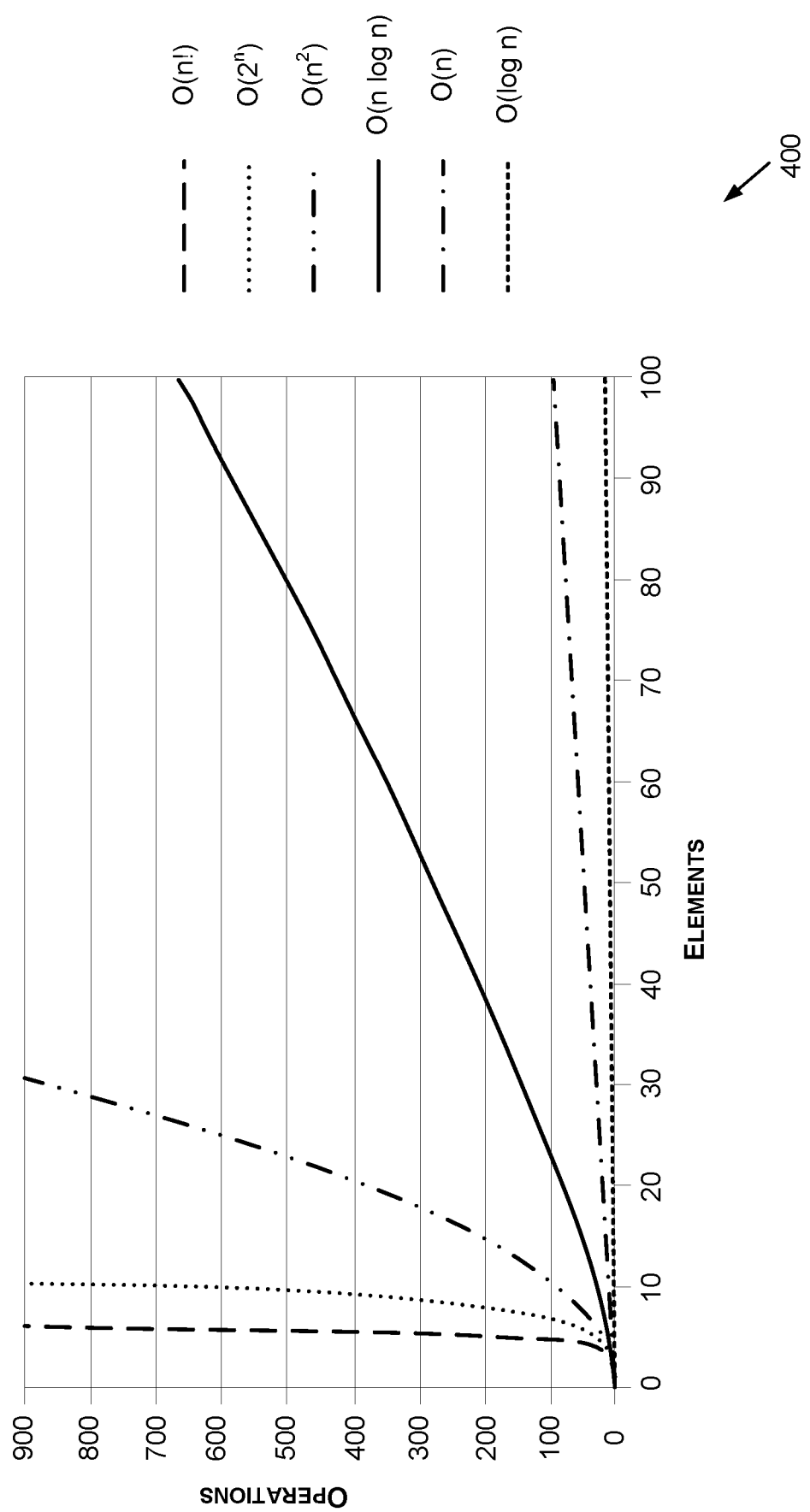
FIG. 4 shows an example graph depicting a number of algorithmic efficiencies.

FIG. 4 shows an example graph 400 depicting a number of algorithmic efficiencies. As discussed above, algorithmic complexity of an algorithm refers to an average or worst time runtime complexity of an algorithm. The algorithmic complexity of an algorithm specifies an average number of steps taken on any instance of size x. That is, the amortized runtime complexity of the algorithm is a function defined by a sequence of operations applied to the input of size x and averaged over time.

Algorithmic complexities are often denoted in "Big O notation." "O(log n)" is an example of an algorithmic complexity (log n) denoted with a capital "O." Big O notation is used to classify algorithms by how they respond to changes in input size, such as how the processing time of an algorithm changes as the problem size becomes extremely large. Thus, Big O notation characterizes functions according to their growth sizes such that different algorithms with the same growth rate may be represented using the same O notation. As an example, "O(log n)" indicates that the limiting behavior of an algorithm) has an order of (log n).

The graph 400 is intended to illustrate several different algorithmic complexities. For example, O(n!), O($2^n$), O($n^2$), O(n log n), O(n), and O(log n). The complexities provided are merely a few of many various complexities that may be utilized to classify/characterize an algorithms efficiency. O(1), which is not depicted, may also be used to classify an algorithm as having constant time. Algorithms that have constant time do not vary based on the size of the input. For example, determining if an integer is even or odd may be performed in constant time. Likewise, accessing a single element in an indexed list may be performed in constant time.

As a brief summary of the depicted complexities is provided. O(log n) is also referred to as "logarithmic time" and the logarithm is frequently base 2 although the notation is used regardless of the base of the logarithm. An example of an algorithm that operates in logarithmic time is a binary search. O(log n) algorithms are considered highly efficient, as the operations per instance required to complete decrease with each instance.

O(n) is also referred to as "linear time." An algorithm that runs in linear time means that for large enough input sizes, the running time increases linearly with the size of the input. An example of an algorithm that operates in linear time is an algorithm that finds the smallest or largest item in an unsorted list. Thus, as depicted in the graph 400, O(log n) is on an order that is more efficient than O(n) in that, as inputs grow large, the operations require to complete an instance of the algorithm having O(log n) complexity is quite lower than the operations required by an algorithm having O(n) complexity.

O(n log n) is also referred to as "linearithmic time." An example of an algorithm that operates in linearithmic time is a fastest-possible comparison sort. $O(n^2)$ is also referred to as "quadratic time," and an example of algorithms that operates in quadratic time includes bubble sort and insertion sort. $O(2^n)$ is also referred to as "exponential time," and an example of an algorithm that operates in exponential time is a brute force search. O(n!) is also referred to as "factorial time," and an example of an algorithm that operates in factorial time includes an algorithm for solving a problem such as "given a list of cities and the distances between each pair of cities, what is the shortest possible route that visits each city exactly once and returns to the original city?" The algorithmic complexities depicted in FIG. 4, from least efficient, to most efficient, are thus, O(n!), $O(2^n)$, $O(n^2)$, O(n log n), O(n), and O(log n).

Figure 5:
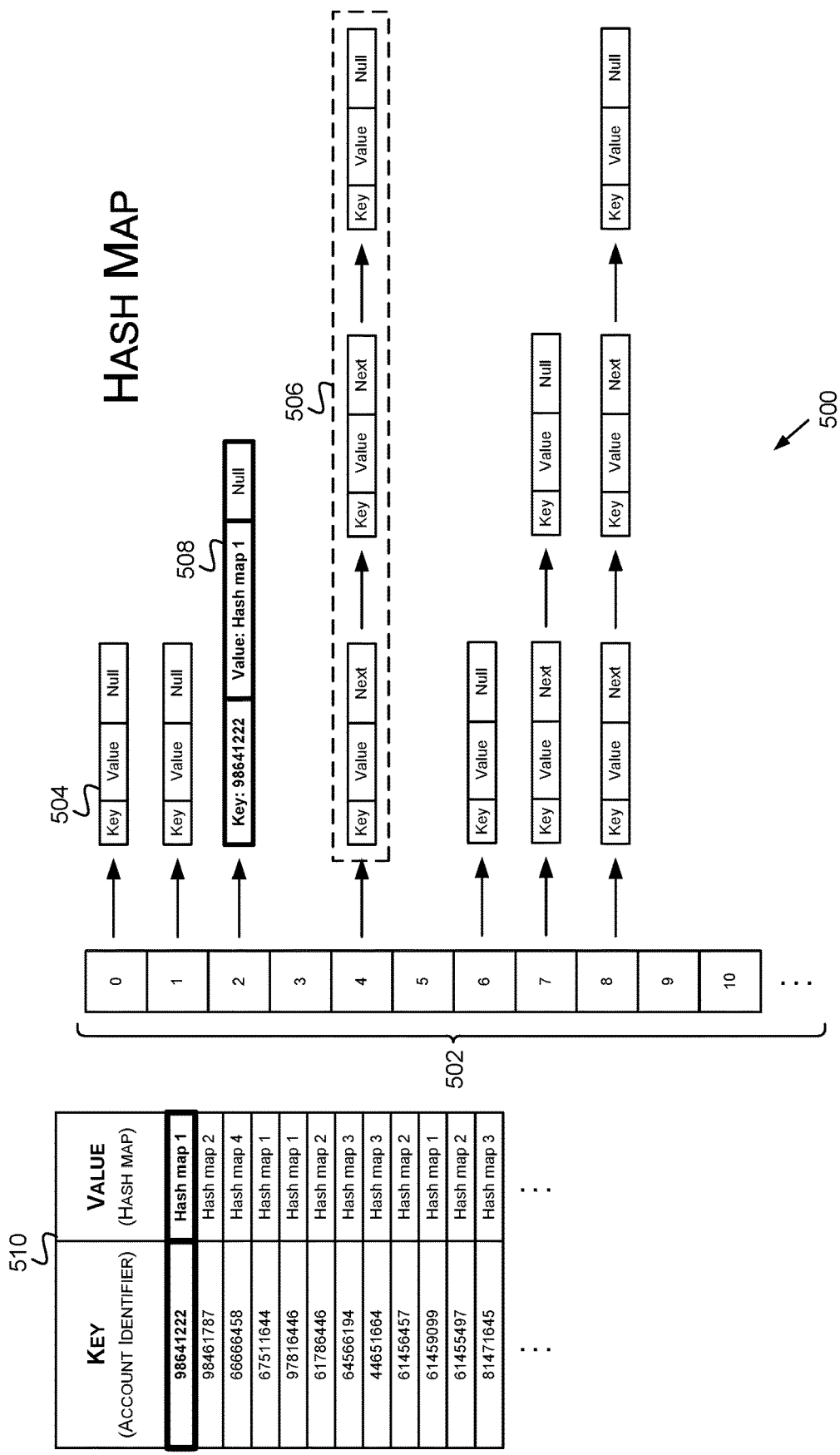
FIG. 5 shows a first example data structure that may be utilized by the distributed computing system in accordance with at least one embodiment.

FIG. 5 shows a first example data structure 500 that may be utilized by the distributed computing system (e.g., the distributed computing system 108 of FIG. 1) in accordance with at least one embodiment. In the example depicted in FIG. 5, the data structure 500 is a hash map. The data structure may include a number of keys (e.g., keys 502). Each key may be associated with a linked list of key/value pairs. For example, key "0" may be associated with a linked list which includes key/value pair 504. Each element in the linked list associated with a key may point to the next element in the linked list, unless the element is the last in the linked list, in which case the pointer element may be null/unassigned. For example, see the linked list 506 of FIG. 5.

The data structure 500 may be utilized with a hash function to distribute a number of key/value pairs over the buckets 502 in the data structure 500. In at least one example, the hash function utilized should maintain a "balanced hash map" in that key/value pairs are evenly distributed (e.g., the same/similar number of key/value pairs for each of the buckets 502). Accordingly, an average time complexity for a well-balanced hash map may be performed in constant time (O(1)) while a worse-case scenario including a unevenly balanced hash map may be performed in linear time (O(n)).

By way of example, a hash function may be utilized to hash a key (e.g., an account identifier such as "98641222"). The hashed key may equal "2" which may correspond to bucket "2." Accordingly, the key ("98641222") and it's corresponding value (e.g., "hash map 0," an identifier for another hash map) may be assigned to bucket "2" as depicted in FIG. 5. The entry 508 may have its pointer element set to "null" given that it is the sole entry assigned to bucket "2."

In at least one example, each key in table 510 may be hashed with the hash function to determine an appropriate bucket within the data structure 500. Accordingly, an entry for each key/value pair in the table 510 may be inserted into the data structure 500 according to the bucket determined. In at least one example, the manager node 110 of FIGS. 1 and 2 (or a component of the manager node 110, for example, the distribution module 212, the search processing module 214, etc.) may perform operations to create, manage, store, and/or access the data structure 500. In other examples, the worker node 112 of FIGS. 1 and 3 (or a component of the worker node 112) may perform operations to manage, store, and/or access the data structure 500. Thus, the data structure 500 may be stored in the distributed data store 116 of FIGS. 1 and 2, the distributed data store 120 of FIGS. 1 and 3, and/or any suitable storage location.

Figure 6:
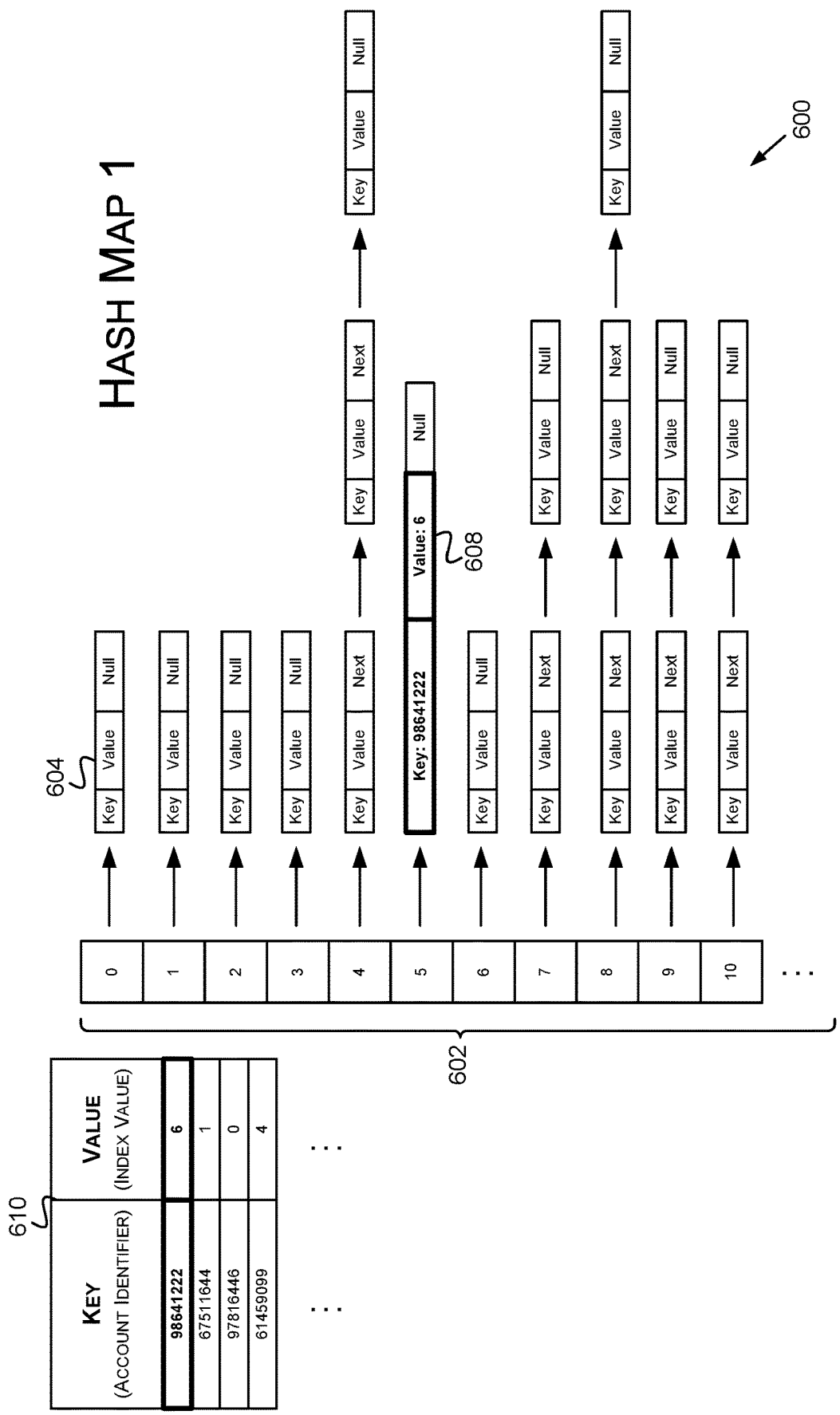
FIG. 6 shows a second example data structure that may be utilized by the distributed computing system in accordance with at least one embodiment.

FIG. 6 shows a second example data structure 600 that may be utilized by the distributed computing system (e.g., the distributed computing system 108 of FIG. 1) in accordance with at least one embodiment. In the example depicted in FIG. 6, the data structure 600 is a hash map. The data structure may include keys 602, each key having an identifier (e.g., 0, 1, 2, 3, or a suitable alphanumeric identifier). Each key may be associated with a linked list of key/value pairs. For example, key "0" may be associated with a linked list which includes key/value pair 604. As indicated above, each element in a linked list associated with a key may point to the next element in the linked list, unless the element is the last in the linked list, in which case the pointer element may be null/unassigned.

The data structure 600 may be utilized with a hash function to distribute a number of key/value pairs over the keys 602 in the data structure 600. As before, in at least one example, the hash function utilized should maintain a "balanced hash map" in that key/value pairs are evenly distributed (e.g., the same/similar number of key/value pairs for each of the keys 602).

By way of example, a hash function may be utilized to hash a key (e.g., an account identifier such as "98641222"). In some examples the key utilized with data structure 600 may be the same, or a different key, then the key utilized with data structure 500 of FIG. 5. The hashed key may equal "5" which may correspond to key "5" of the data structure 600. Accordingly, the key ("98641222") and it's corresponding value (e.g., "6," an index value) may be assigned to key "5" of the data structure 600 as depicted in FIG. 6. The entry 608 may have its pointer element set to "null" given that it is, currently, the sole entry assigned to key "5."

In at least one example, each key of the data (depicted in table 610) may be hashed with the hash function to determine a corresponding key within the data structure 600. Accordingly, an entry for each key/value pair in the table 610 may be inserted into the data structure 600 according to the hashed key (e.g., one of the keys 602) determined from the key (e.g., the account identifier). In at least one example, the worker node 112 of FIGS. 1 and 3 (or a component of the worker node 112, for example, the data structure management module 312, the search processing module 314, etc.) may perform operations to create, manage, store, and/or access the data structure 600.

FIG. 7 shows a third example data structure 700 that may be utilized by the distributed computing system in accordance with at least one embodiment. In the example depicted in FIG. 7, the data structure 700 is an array, although it may be any suitable indexed list. The data structure 700 may include a set of data (e.g., transaction processing data such as account details for various accounts included in column 702) that is indexed by a key (e.g., the keys of column 704).

Continuing with the example of FIG. 6, the entry 706 may correspond to the data associated with the account identifier ("98641222"). As described above, account identifier "98641222" was associated with index value "6" in data structure 600. Accordingly, the transaction processing data (e.g., the account details for account identifier 98641222) may be associated with index value "6" in the data structure 700. The data structure 700 may be stored, for example, in the centralized data store 122 of FIGS. 1-3 or another suitable location. The data structure 700 may include a predefined number of entries, or the data structure 700 may dynamically grow as more transaction processing data is received by the system.

As a non-limiting example, as new accounts are added to the distributed computing system, new entries may be added to the data structure 700 corresponding to the transaction processing data (e.g., the account details) for each new account. As a transaction processing data for the new account is indexed in data structure 700, the index value may be stored in the data structure 600 as a value in a key/value pair (the key being the account identifier of the new account). Similarly, the location and/or identification of the data structure 600 may be stored in the data structure 500 as a value in a key/value pair (the key being the account identifier of the new account).

In at least one embodiment, the manager node 110 of FIGS. 1 and 2 may be responsible for maintaining the data structure 700, although other suitable devices may be utilized. In at least one example, the data structure 700 may be one of many similar data structures responsible for maintaining associations between transaction processing data and indexes. The data structure 700 and/or the other similar data structures may be stored in the centralized data store 122 of FIGS. 1-3 or the data structure 700 may instead be stored in the distributed data store 116 of a manager node and/or the distributed data store 120 of a worker node.

Figure 8:
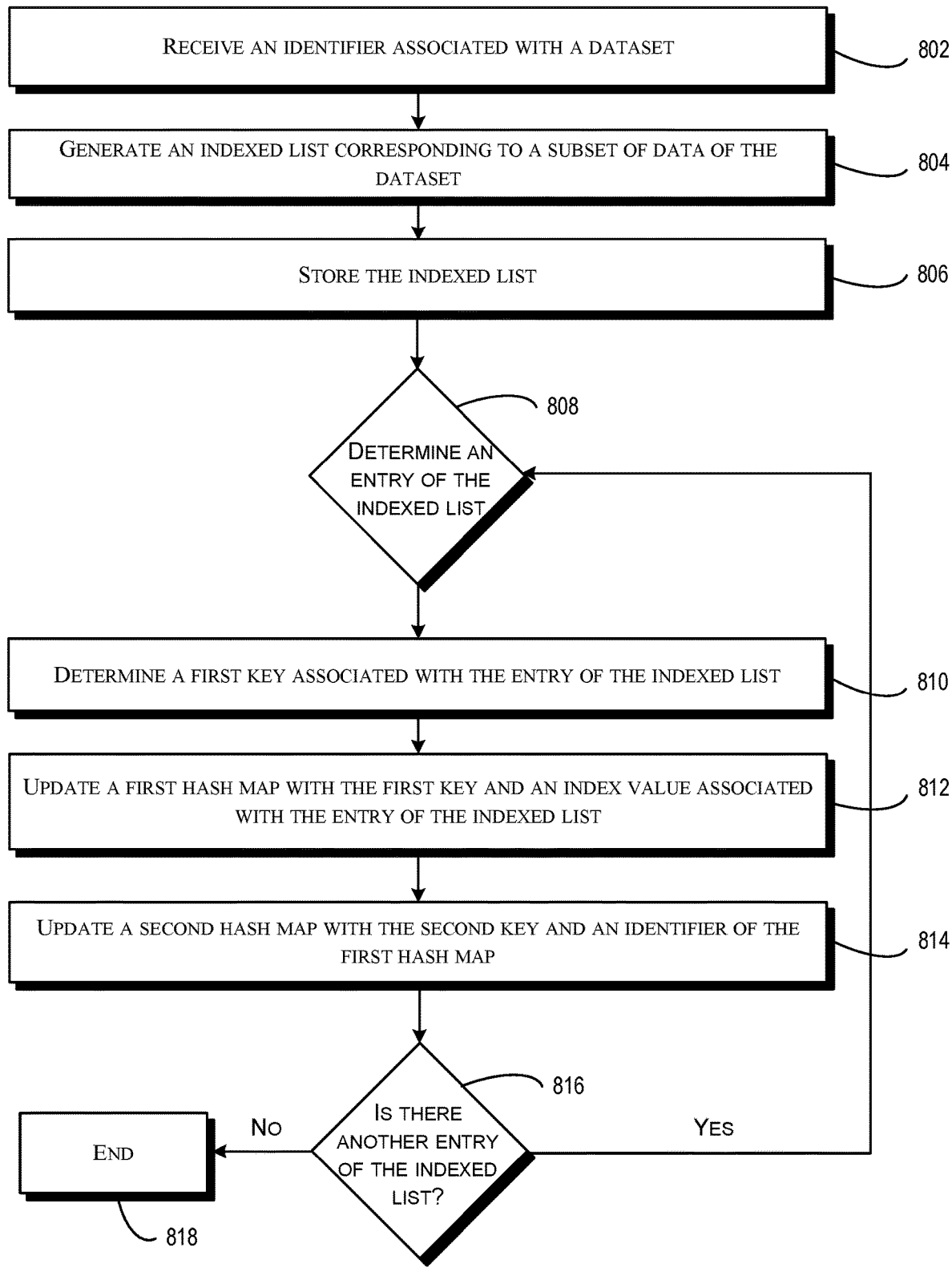
FIG. 8 shows a flow diagram illustrating an example process for distributing portions of a data set amongst a group of nodes in accordance with at least one embodiment.

FIG. 8 shows a flow diagram illustrating an example process 800 for distributing portions of a data set amongst a plurality of nodes in accordance with at least one embodiment. The process 800 may begin at block 802, where an identifier associated with a data set may be received (e.g., by manager node 110 of FIGS. 1 and 2). The identifier may be an alphanumeric label, an address, or an suitable data for identifying a data set. At block 804, an indexed list may be generated. The indexed list may correspond with a subset of data of the data set. By way of example, the subset may comprise transaction processing data of the data set. Consider that the original data set has account identifiers associated with transaction processing data (e.g., address information, user name/password, account holder information, past transaction information, etc.). The transaction processing data may be extracted and an indexed list may be generated (e.g., by the manager node 110 by a processor of a centralized system, or the like). Accordingly, each entry of transaction processing data individually corresponding to an account identifier may be assigned an index value.

At block 806, the indexed list may be stored (e.g., by the manager node 110 in the distributed data store 120 and/or the centralized data store 122 of FIG. 1). The indexed list may be accessible to the manager node 110 (and any other manager node of the distributed computing system 108) and the worker node 112 (and any other worker node of the distributed computing system).

At decision point 808, an entry of the indexed list may be determined (e.g., a first entry). The entry may be associated with a particular account identifier. At block 810, a first key (e.g., the account identifier) associated with the entry of the indexed list may be determined.

In at least one embodiment, a first hash map may be updated with the first key and an index value associated with the entry of the indexed list at block 812. In an alternative embodiment, a hash map update request message may be sent at block 812 (e.g., by the manager node 110). The hash map update request message may include the first key. In other examples, the hash map update request message may include an entire hash map. In some examples receipt of the hash map update request message (e.g., by the worker node 112) may cause a first hash map to be updated and/or created with the first key and an index value associated with the entry of the indexed list. In at least one example, the manager node 110 may determine memory usage of one or more worker nodes (e.g., worker node 112). If, for example, worker node 112 has available memory to store a key/value pair comprising the first key and index value, then the manager node 110 may select the worker node 112 as the destination of the hash map update request message. If the worker node 112 does not have available memory, the manager node 110 may select another worker nodes of the distributed computing system 108 that has available memory and direct the hash map update request message to the worker node with the available memory. Through such a process, the manager node 110 may ensure that memory constraints of the worker nodes (which may vary between worker nodes) are a factor in where the first key/index value pair eventually gets stored.

At block 814, a second hash map may be updated with the second key and an identifier of the first hash map. In at least one embodiment, the second key may be the same or different than the first key. At decision point 816, a determination may be made as to whether another unprocessed entry of the indexed list exists. If no unprocessed entries exist, the method may end at block 818. If further unprocessed entries exist, the process may return to decision point 808. The process may repeat blocks 808-816 until there are no unprocessed entries in the indexed list, at which time, the process may end at block 818.

Upon completion of the process 800, a first hash map may be provided that maps each key (e.g., account identifier) to a corresponding second hash map that maps the key to an index value. The first hash map (key to hash map/hash map identifier), may be stored in the distributed data store 116 and/or the distributed data store 120, while the second hash map (key to index value) may be stored on the worker node 112 (e.g., in the distributed data store 120). Other corresponding hash maps (those that map keys to index values) may be stored on various other worker nodes of a distributed computing system according to the memory constraints of each worker node. In some embodiments, the distributed data store 120 may be configured to store any suitable combination of the data structures 500-800. In at least one example, a copy of every data structure discussed herein, including the data structures 500, 600 and/or 700) may be stored on one or more worker nodes (e.g., each worker node) in the distributed computing system. The indexed list may be stored in any suitable location (e.g., in a data store of the manager node 110, in a data store of the worker node 112, in a data store of every worker node 112, in the centralized data store 122, or the like).

Figure 9:
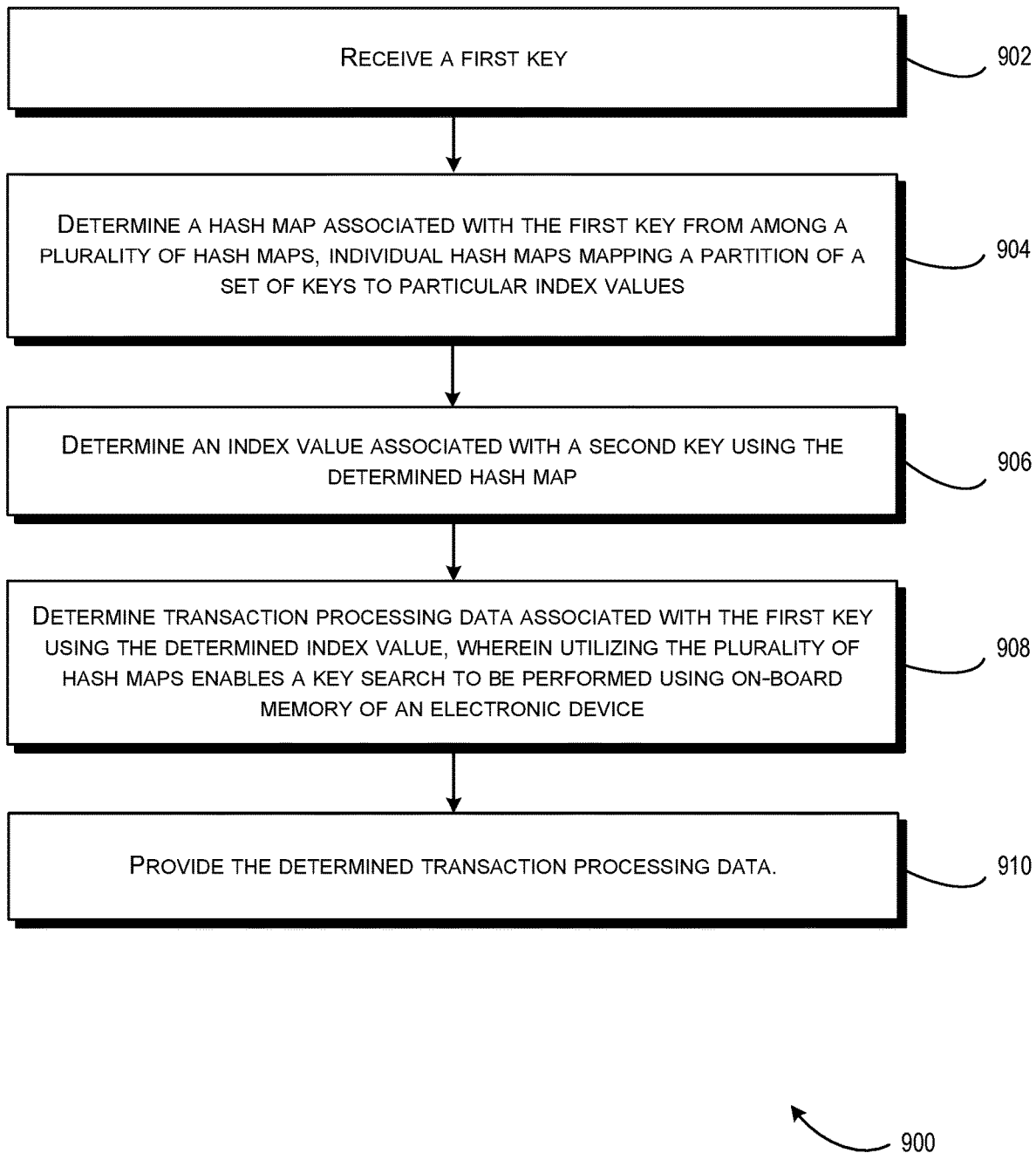
FIG. 9 shows a flow diagram illustrating an example process for conducting a search utilizing the data structures of FIGS. 5-7, in accordance with at least one embodiment.

FIG. 9 shows a flow diagram illustrating an example process 900 for conducting a search utilizing the data structures of FIGS. 5-7, in accordance with at least one embodiment. The process 900 may begin at block 902 where a first key may be received (e.g., by the manager node 110 of FIGS. 1 and 2). In at least one example the first key comprises an account identifier associated with an account holder. The first key may be received, for example, by the manager node 110 via a request message.

At block 904, a hash map associated with the first key may be determined from among a plurality of hash maps. Each of the plurality of hash maps may map a subset keys of a larger data set to particular index values. Each of the plurality of hash maps may be configured to be loaded onto on-board memory (e.g., RAM) of an electronic device (e.g., the worker node 112). As a non-limiting example, the manager node 110 upon receipt of the first key, may hash the first key and utilize the hashed key and a stored hash map (e.g., a hash map that maps keys to hash map identifiers/locations) to determine the hash map associated with the key. In another example, the worker node 112 may perform such functions (e.g., receive the key, hash the key, use the hashed key to determine a stored hash map). In either example, the determined hash map may be located in memory on a particular worker node (e.g., the worker node 112).

At block 906, an index value associated with a second key (e.g., also the account identifier) may be determined utilizing the determined hash map. For example, the second key may be hashed and the hashed key input into the determined hash map (one that maps keys to index values). Such functions may be performed by the worker node 112. Accordingly, the index value associated with the second key may be returned.

At block 908, transaction processing data associated with the first key may be determined using the determined index value. For example, the worker node 112 may utilize the index value corresponding to the first key (as determined utilizing a hash map stored on the worker node 112, the hash map mapping account identifiers to index values) to perform a look up from an indexed list. The indexed list may be stored in a location accessible to the worker node 112 (e.g., in the centralized data store 122, in the distributed data store 120, or any suitable storage location). The indexed list, as discussed above, may map index numbers to transaction processing data associated with an account. Thus, by inputting an index value, the transaction processing data corresponding to the first key may be returned.

At block 910, the determined transaction processing data may be provided. For example, the worker node 112 may return the transaction processing data to the manager node 110 which may, in turn, provide the transaction processing data to an electronic device that initiated the request message.

Technical Benefits

Embodiments of the present invention may provide the ability for data searches to be conducted more efficiently than the operations currently required in current distributed computing systems. Specifically, each of the hash maps discussed above are capable of being loaded into on-board memory (e.g., RAM) of the storage device (e.g., the manager node, the worker node, etc.). In some examples, every data structure generated may be loaded in on-board memory of a device (e.g., a worker node). Accordingly, in some examples, searches may be conducted on a single device with constant algorithmic complexity (e.g., O(1)). Additionally, in some examples, a dataset that is larger (e.g., 2 TB) than the storage capacity (e.g., 64 GB, 128 GB, etc.) of a single node in a distributed computing system may have portions of its data be distributed into customized data structures (e.g., an indexed list, and multiple hash maps). Each of the data structures providing a constant algorithmic complexity of O(1). Thus, a data search conducted using these customized data structures enables the search time to be constant rather than having a variable search time as in previous systems. Additionally, the searches may be performed in less time as the memory being utilized by the manager node(s) and the worker node(s) is RAM which, by its very nature, is faster to search than data stored on disk (e.g., a hard drive).

Example Computer Systems

The various participants and elements described herein may operate one or more computer apparatuses to facilitate the functions described herein. Any of the elements in the above-described FIG. 1, including any servers or databases, may use any suitable number of subsystems to facilitate the functions described herein.

Examples of such subsystems or components shown in the above figures may be interconnected via a system bus. Additional subsystems such as a printer, keyboard, fixed disk (or other memory comprising computer readable media), monitor, which is coupled to display adapter, and others may be included. Peripherals and input/output (I/O) devices, which couple to I/O controller (which can be a processor or other suitable controller), can be connected to the computer system by any number of means known in the art, such as a serial port. For example, the serial port or an external interface can be used to connect the computer apparatus to a wide area network such as the Internet, a mouse input device, or a scanner. The interconnection via system bus allows the central processor to communicate with each subsystem and to control the execution of instructions from system memory or a fixed disk, as well as the exchange of information between subsystems. The system memory and/or the fixed disk may embody a computer readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A computer-implemented method, comprising:

receiving, by a manager electronic device among a plurality of electronic devices of a distributed computing system, a request message for transaction processing data, from a user device operated by a user, the request message comprising a first key among a plurality of keys, wherein the first key is associated with the transaction processing data and is an alphanumeric identifier corresponding to an account identifier of the user;

in response to the receiving the request message, hashing, by the manager electronic device, the first key to obtain a first hashed key;

identifying, by the manager electronic device, a first worker electronic device among respective worker electronic devices as a storage location of a first hash map associated with the first key among a plurality of hash maps, by inputting, to a second hash map, the first hashed key and obtaining an identifier of the first hash map, wherein the plurality of hash maps is stored on the respective worker electronic devices among the plurality of electronic devices, wherein each of the respective worker electronic devices stores a portion of the plurality of hash maps that corresponds to a corresponding subset of keys among the plurality of keys, each individual hash map among the plurality of hash maps provides a mapping of keys included in the corresponding subset of keys, to index values, respectively, each of the respective worker electronic devices stores a corresponding indexed list in which the index values are mapped to respective pieces of transaction processing data of the corresponding subset of keys, and the first hash map associated with the first key is the portion of the plurality of hash maps that is loaded into an on-board memory of the first worker electronic device;

sending, by the manager electronic device to the first worker electronic device, the request message;

in response to the request message, hashing, by the first worker electronic device, the first key to produce a second hashed key;

obtaining, by the first worker electronic device, an index value corresponding to the first key in the first hash map, by inputting the second hashed key into the first hash map, and obtaining, from the first hash map, the index value corresponding to the second hashed key;

performing, by the first worker electronic device, a lookup of the transaction processing data corresponding to the first key in a first indexed list loaded to the on-board memory of the first worker electronic device, by inputting the index value acquired from the first hash map into the first indexed list and obtaining the transaction processing data associated with the first key that corresponds to the index value from the first indexed list, wherein the first indexed list provides an array mapping of index values to respective pieces of transaction processing data of keys of the corresponding subset of keys that correspond to the first hash map; and sending, by the first worker electronic device to the manager electronic device, a response message comprising the transaction processing data associated with the first key, the response message being a response to the request message sent by the manager electronic device to the first worker electronic device;

wherein utilizing, by the manager electronic device, the plurality of hash maps stored with corresponding indexed lists in the respective worker electronic devices enables the obtaining the respective pieces of transaction processing data corresponding to the plurality of keys, respectively, to be performed in a constant time according to a constant $O(1)$ algorithmic complexity, for each of the respective pieces of transaction processing data, and wherein the first indexed list is one of the corresponding indexed lists.

2. The method of claim 1, wherein each individual hash map of the plurality of hash maps corresponds to a subset of data of a data set.

3. The method of claim 2, wherein the transaction processing data associated with the first key is determined faster using the plurality of hash maps than by searching for the transaction processing data corresponding to the first key in the data set.

4. A distributed computing system, comprising:

a plurality of electronic devices comprising a manager node and worker nodes, wherein the manager node comprises a first processor, and a first computer-readable medium coupled to the first processor, the first computer-readable medium comprising code which, when executed by the first processor, causes the first processor to implement a first method including:

receiving a request message for transaction processing data, from a user device operated by a user, the request message comprising a first key among a plurality of keys, wherein the first key is associated with the transaction processing data and is an alphanumeric identifier corresponding to an account identifier of the user;

in response to the receiving the request message, hashing the first key to obtain a first hashed key;

identifying a first worker node among the worker nodes as a storage location of a first hash map associated with the first key among a plurality of hash maps, by inputting, to a second hash map, the first hashed key and obtaining an identifier of the first hash map, wherein the plurality of hash maps is stored on the worker nodes, respectively, each of the worker nodes stores a portion of the plurality of hash maps that corresponds to a corresponding subset of keys among the plurality of keys, each individual hash map among the plurality of hash maps provides a mapping of keys included in the corresponding subset of keys, to index values, respectively, and each of the worker nodes stores a corresponding indexed list in which the index values are mapped to respective pieces of transaction processing data of the corresponding subset of keys, wherein the first hash map associated with the first key is the portion of the plurality of hash maps that is loaded into an on-board memory of the first worker node; and sending, to the first worker node, the request message;

wherein the first worker node comprises a second processor, and a second computer-readable medium coupled to the second processor, the second computer-readable medium comprising code which, when executed by the second processor, causes the second processor to implement for a second method including:

in response to the receiving the request message from the manager node, hashing the first key to produce a second hashed key;

obtaining an index value corresponding to the first key in the first hash map, by inputting the second hashed key into the first hash map, and obtaining, from the first hash map, the index value corresponding to the second hashed key;

performing a lookup of the transaction processing data corresponding to the first key in a first indexed list loaded to the on-board memory of the first worker node, by inputting the index value acquired from the first hash map into the first indexed list and obtaining the transaction processing data associated with the first key that corresponds to the index value from the first indexed list, wherein the first indexed list provides an array mapping of index values to respective pieces of transaction processing data of keys of the corresponding subset of keys that correspond to the first hash map; and sending, to the manager node, a response message comprising the transaction processing data associated with the first key, the response message being a response to the request message sent by the manager node to the first worker node, wherein utilizing, by the manager node, the plurality of hash maps stored with corresponding indexed lists in the worker nodes enables the obtaining the respective pieces of transaction processing data corresponding to the plurality of keys, respectively, to be performed in a constant time according to a constant O(1) algorithmic complexity, for each of the respective pieces of transaction processing data, and wherein the first indexed list is one of the corresponding indexed lists.

5. The distributed computing system of claim 4, wherein each of the plurality of hash maps and each of the corresponding indexed lists individually correspond to a subset of data of a data set.

6. The distributed computing system of claim 5, wherein the transaction processing data associated with the first key is determined faster using the first hash map, the second hash map, and the first indexed list than by searching for the transaction processing data corresponding to the first key in the data set.

7. An electronic device, comprising:

a processor, and a computer-readable medium coupled to the processor, the computer-readable medium comprising code which, when executed by the processor, causes the processor to:

receive a request message for transaction processing data, from a user device operated by a user, the request message comprising a first key among a plurality of keys, wherein the first key is associated with the transaction processing data and is an alphanumeric identifier corresponding to an account identifier of the user, in response to the receiving the request message, hash the first key to obtain a first hashed key, identify a first worker electronic device among worker electronic devices of a distributed computing system as a storage location of a first hash map associated with the first key among a plurality of hash maps, by inputting, to a second hash map, the first hashed key and obtaining an identifier of the first hash map, wherein the plurality of hash maps is stored on the worker electronic devices, respectively, wherein each of the worker electronic devices stores a portion of the plurality of hash maps that corresponds to a corresponding subset of keys among the plurality of keys, each individual hash map among the plurality of hash maps provides a mapping of keys included in the corresponding subset of keys, to index values, respectively, each of the worker electronic devices stores a corresponding indexed list in which the index values are mapped to respective pieces of transaction processing data of the corresponding subset of keys, and the first hash map associated with the first key is the portion of the plurality of hash maps that is loaded into an on-board memory of the first worker electronic device; and send, to the first worker electronic device, the request message, wherein, in response to the request message, the first worker electronic device hashes the first key to produce a second hashed key, obtains an index value corresponding to the first key in the first hash map, by inputting the second hashed key into the first hash map, obtains from the first hash map, the index value corresponding to the second hashed key, and performs a lookup of the transaction processing data corresponding to the first key in a first indexed list loaded to the on-board memory of the first worker electronic device, by inputting the index value acquired from the first hash map into the first indexed list and obtaining the transaction processing data associated with the first key that corresponds to the index value from the first indexed list, wherein the first indexed list provides an array mapping of index values to respective pieces of transaction processing data of keys of the corresponding subset of keys that correspond to the first hash map, wherein the processor receives, from the first worker electronic device, a response message comprising the transaction processing data associated with the first key, the response message being a response to the request message sent by the processor to the first worker electronic device, wherein utilizing, by the electronic device, the plurality of hash maps stored with corresponding indexed lists in the worker electronic devices enables obtaining the respective pieces of transaction processing data corresponding to the plurality of keys, respectively, to be performed in a constant time according to a constant O(1) algorithmic complexity, for each of the respective pieces of transaction processing data, and wherein the first indexed list is one of the corresponding indexed lists.

8. The electronic device of claim 7, wherein each individual hash map of the plurality of hash maps corresponds to a subset of a data set.

* * * * *